United States Patent
Maeda et al.

(10) Patent No.: US 10,843,251 B2
(45) Date of Patent: Nov. 24, 2020

(54) METHOD FOR JOINING MEMBERS

(71) Applicant: Kobe Steel, Ltd., Hyogo (JP)

(72) Inventors: Yasuhiro Maeda, Kobe (JP); Toru Hashimura, Kobe (JP); Kenichi Watanabe, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 157 days.

(21) Appl. No.: 16/327,888

(22) PCT Filed: Sep. 6, 2017

(86) PCT No.: PCT/JP2017/032135
§ 371 (c)(1),
(2) Date: Feb. 25, 2019

(87) PCT Pub. No.: WO2018/061684
PCT Pub. Date: Apr. 5, 2018

(65) Prior Publication Data
US 2019/0193135 A1 Jun. 27, 2019

(30) Foreign Application Priority Data
Sep. 28, 2016 (JP) .................. 2016-190068

(51) Int. Cl.
*B21D 39/06* (2006.01)
*B21D 39/20* (2006.01)
(Continued)

(52) U.S. Cl.
CPC .......... *B21D 39/06* (2013.01); *B21D 39/20* (2013.01); *B21D 53/88* (2013.01); *B62D 25/025* (2013.01);
(Continued)

(58) Field of Classification Search
CPC ........ B21D 39/06; B21D 53/88; B21D 39/20; B21D 39/206; B62D 29/008; B62D 25/025; B62D 27/023; B62D 25/04
See application file for complete search history.

(56) References Cited

U.S. PATENT DOCUMENTS

| 5,372,400 A | 12/1994 | Enning et al. |
| 8,272,682 B2 * | 9/2012 | Cimatti .................. B62D 25/04 |
| | | 296/204 |
| 2018/0015527 A1 | 1/2018 | Maeda et al. |

FOREIGN PATENT DOCUMENTS

| JP | 06-504013 A | 5/1994 |
| JP | 2001-233243 A | 8/2001 |

(Continued)

OTHER PUBLICATIONS

Imamura, JP-2007-203325A Machine translations (Year: 2007).*
(Continued)

*Primary Examiner* — Lee A Holly
(74) *Attorney, Agent, or Firm* — Studebaker & Brackett PC

(57) ABSTRACT

In a method for joining members of the present invention, a B-pillar, a rocker, a side panel served as frame members of a vehicle body, and an elastic body are provided. The B-pillar includes a tubular portion and an extension portion extended from the tubular portion. The rocker includes a first hole portion. The side panel includes a support portion. Next, the tubular portion of the B-pillar is inserted into the first hole portion of the rocker. The elastic body is inserted into the tubular portion of the rocker. The elastic body is pressurized in an axial line L1 direction of the tubular portion of the B-pillar to be expanded outward in a radial direction of the axial line L1, so that the tubular portion of the B-pillar is expanded and deformed to be joined to the first hole portion of the rocker by press-fitting. Further, the
(Continued)

extension portion of the B-pillar and the support portion of the side panel are joined by a method different from joining by press-fitting.

14 Claims, 12 Drawing Sheets

(51) Int. Cl.
*B62D 27/02* (2006.01)
*B62D 25/04* (2006.01)
*B21D 53/88* (2006.01)
*B62D 29/00* (2006.01)
*B62D 25/02* (2006.01)

(52) U.S. Cl.
CPC ........... *B62D 25/04* (2013.01); *B62D 27/023* (2013.01); *B62D 29/008* (2013.01)

(56) References Cited

FOREIGN PATENT DOCUMENTS

| JP | 2007203325 A | * | 8/2007 |
| JP | 2009-161056 A | | 7/2009 |
| JP | 2016-147309 A | | 8/2016 |
| WO | 2016125507 A1 | | 8/2016 |

OTHER PUBLICATIONS

International Search Report issued in PCT/JP2017/032135; dated Nov. 21, 2017.
International Preliminary Report on Patentability issued in corresponding International Application No. PCT/JP2017/032135; dated Apr. 11, 2019.

* cited by examiner

METHOD FOR JOINING MEMBERS

CROSS-REFERENCE TO RELATED APPLICATIONS

This is a national phase application in the united states of international patent application no. PCT/JP2017/032135 with an international filing date of Sep. 6, 2017, which claims priority of Japanese Patent Application no. 2016-190068 filed on Sep. 28, 2016 the contents of which are incorporated herein by reference.

TECHNICAL FIELD

The present disclosure relates to a method for joining members.

BACKGROUND ART

For weight reduction and safety improvement for automobiles, there have been used metals with lower specific weights and higher strengths, which are called high-tension steels. High-tension steels are effective in weight reduction and safety improvement, but have larger weights than those of materials with lower specific weights, such as aluminum. Further, in cases where such high-tension steels are used, there are induced the problems of degradation in moldability, increases in molding loads, degradation in size accuracy and the like, since such high-tension steels have higher strengths. In order to overcome these problems, in recent years, there have been advanced multi-material techniques for utilizing steel components in combination with extruded-molded articles, casted articles and press-molded articles which are formed from aluminum with lower specific weights than those of steels.

For realizing such multi-material techniques, there is a problem of joining metals of different types, such as steel components and aluminum components, to each other. For example, JP 2016-147309 A discloses a member joining method which employs an elastic body for enabling joining between metals of different types for realizing multi-material techniques. According to the member joining method in JP 2016-147309 A, an aluminum pipe (second member) is inserted into a hole portion of a steel component (first member), then an elastic body is inserted into the inside of the aluminum pipe, and the elastic body is pressurized to expand the aluminum pipe, thereby joining the steel member and the aluminum pipe by press-fitting.

SUMMARY OF THE INVENTION

Problems to be Solved by the Invention

Regarding the member joining method disclosed in JP 2016-147309 A, there is no description about provision of a draft angle in the hole portion of the first member. For example, in cases where the first member is a die-molded article such as a die-casted article, a casted article, a forged article or a resin product, it is necessary that the hole portion in the first member is provided with the draft angle in view of detachability from the die. However, regarding the member joining method disclosed in JP 2016-147309 A, there is no particular description about a member joining method which is effective in such cases.

Embodiments of the present invention have been made in view of the aforementioned circumstances, and aim at providing a method for joining members capable of joining plural frame members of a vehicle body easily.

Means for Solving the Problems

A method for joining members according to an embodiment of the present invention includes: providing a first member, a second member, a third member as frame members of a vehicle body, and an elastic body, the first member including a tubular portion and an extension portion extended from the tubular portion, the second member including a first hole portion, and the third member including a support portion; inserting the tubular portion of the first member into the first hole portion of the second member; inserting the elastic body into the tubular portion of the first member; pressurizing the elastic body in an axial line direction of the tubular portion of the first member to be expanded outward in a radial direction of the axial line, so that the tubular portion of the first member is expanded and deformed to be joined to the first hole portion of the second member by press-fitting; and joining the extension portion of the first member and the support portion of the third member by a method different from joining by press-fitting.

According to this method, since the tubular portion of the first member is expanded and deformed evenly by the elastic body, a local load imposed on the first member can be decreased, and a local deformation can be prevented. Accordingly, the accuracy of fitting between the first member and the second member is improved, so that joining strength can be improved. Further, joining by press-fitting using the elastic body is simple compared to the electromagnetic forming used for joining different kind materials or other joining method that requires processing, and therefore joining by press-fitting is especially effective for a case in which the first member and the second member are different materials from each other. Further, since the first member includes the extension portion and the third member includes the support portion, the extension portion and the support portion can be joined by a joining method other than joining by press-fitting using the elastic body. Thus, compared to a case in which only the first member and the second member are joined by press-fitting, the joining body with a complicated configuration can be formed. In other words, since plural members are joined in various manners in the frame of the vehicle body, joining by press-fitting using the elastic body that is simple and is not limited to an applicable material can be applied to a part including the tubular portion, and a known joining method other than joining by press-fitting can be applied to the other part. Consequently, plural frame members of the vehicle body can be joined easily. In particular, when joining by press-fitting is applied to the frame members of the vehicle body, the joining strength endurable against the impact in collision of the vehicle body is required. In this method, the first member and the third member are joined and the first member is supported by third member, and therefore the joining strength of the joining body is improved so as to endure the impact in collision of the vehicle body.

In the method for joining members, a cross section of the tubular portion of the first member in the axial line direction may be formed in a polygonal shape, and each side length of the polygonal shape of the first member in the cross section may fulfill the following formula.

Formula 1

$$d < 1.9t \sqrt{\frac{E}{\sigma_y}} \quad (1)$$

d: each side length of the tubular portion of the first member
t: a plate thickness of the tubular portion of the first member
E: a Young's modulus of the tubular portion of the first member
$\sigma_y$: a yield stress of the tubular portion of the first member If the cross-sectional shape of the tubular portion of the first member is extremely large, the cross section is deformed when a pull-off force is applied, and therefore the joining might be released. However, in this method, each side length of the tubular portion of the first member is set to a predetermined length or less as described in the formula (1), namely the cross-sectional shape is defined not to be extremely large. The formula (1) is defined based on an effective width theory corresponding to a relationship between a size and deformation of a member. Accordingly, in this method using the formula (1), each side length in the cross-sectional shape of the first member is set to a predetermined effective width or less, and therefore the first member is hardly deformed when the pull-off force is applied, and the joining strength can be ensured. Here, each side length d in the formula (1) denotes a length excluding an rounded part of the side in a case in which a corner portion of the tubular portion has the rounded part.

The method for joining members may include: providing a fourth member in which an insertion hole is formed, the fourth member being formed in a tubular shape, as a frame member of the vehicle body; inserting the fourth member into a second hole portion of the second member, the second hole portion being different from the first hole portion; aligning the first hole portion of the second member and the insertion hole of the fourth member; inserting the first member into the first hole portion of the second member and the insertion hole of the fourth member aligned each other; and joining the first member to not only the second member but also the fourth member by press-fitting when the first member is expanded and deformed by the elastic body.

According to this method, not only three members but also four members can be joined as the frame of the vehicle body. In particular, since the first member, the second member, and the fourth member are joined by press-fitting using the elastic body, different kind materials can be joined easily. Further, the pull-off force and the bending force applied to the first member are transmitted to both of the second member and the fourth member, and therefore the pull-off force and the bending force are not concentrated, so that the joining strength of the joining portion is improved.

The method for joining members may include: providing a fourth member formed in a tubular shape, as a frame member of the vehicle body, and an additional elastic body; inserting the tubular portion of the first member into the first hole portion of the second member and then aligning a second hole portion of the second member and an insertion hole of the first member, the second hole portion being different from the first hole portion, and the insertion hole being formed in the tubular portion of the first member; joining the first member and the second member by press-fitting using the elastic body and then inserting the fourth member into the first hole portion of the second member and the insertion hole of the first member aligned each other; inserting the additional elastic body into the fourth member; and pressurizing the additional elastic body in an axial line direction of the fourth member to be expanded outward in a radial direction of the axial line, so that the fourth member is expanded and deformed to be joined to the first member and the second member by press-fitting.

According to this method, not only three members but also four members can be joined as the frame of the vehicle body. In particular, since the first member, the second member, and the fourth member are joined by press-fitting using the elastic body, different kind materials can be joined easily. Further, the first member and the second member are joined by press-fitting and the fourth member is joined to both of the first member and the second member by press-fitting, and therefore joining by press-fitting can be applied to plural parts and the joining strength can be improved.

In the method for joining members, the tubular portion of the first member may be formed of a same kind material as the second member, and the extension portion of the first member may be formed of a same kind material as the third member.

According to this method, the joining of first member and the second member is performed between the same kind metal materials, and therefore electrocorrosion generated between the different kind metal materials can be prevented.

In the method for joining members, the first member may be formed as a B-pillar as a window column at a center of a side portion of the vehicle body, the second member may be formed as a rocker extended in a front-rear direction along a lower edge of the side portion of the vehicle body, and the third member may be formed as a side panel forming the side portion of the vehicle body.

According to this method, since the B-pillar and the rocker served as the frame members of the vehicle body are joined by press-fitting using the elastic body, even if different kind materials are adopted to the B-pillar and the rocker, the B-pillar and the rocker can be joined easily. Further, the B-pillar, the rocker, and the side panel are joined with high joining strength, and therefore the strength of the side portion of the vehicle body can be increased. Accordingly, the deformation of the vehicle body in collision of the side portion becomes less, and therefore a cabin in which a user is located in travelling can be firmly protected.

According to the present invention, in the method for joining members, joining by press-fitting using the elastic body is performed, and therefore the plural frame members of the vehicle body can be joined easily.

MODE FOR CARRYING OUT THE INVENTION

Hereinafter, embodiments of the present invention will be described with reference to the attached drawings.

First Embodiment

Figure 1:
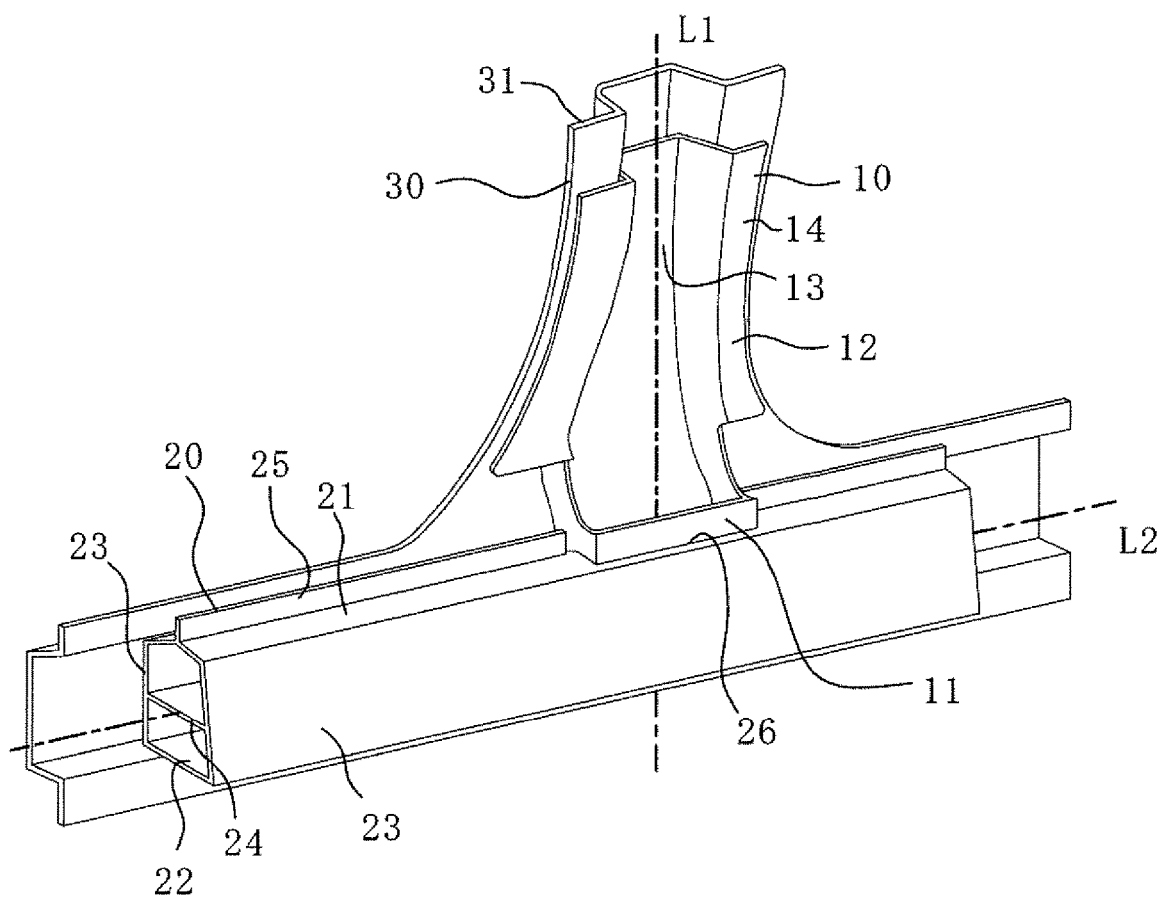
FIG. 1 is a perspective view illustrating a B-pillar, a rocker panel, and a side panel to which a method for joining members according to a first embodiment is applied.

As shown in FIG. 1, a method for joining members of the present embodiment is to join a B-pillar (a first member) 10, a rocker (a second member) 20, and a side panel (a third member) 30 of frame members of a vehicle body. The B-pillar 10, the rocker 20, and the side panel 30 are joined at a lower side in a side portion of the vehicle body, surrounded by a dashed line in a frame of the vehicle body shown in FIG. 2. Here, the method for joining members of the present embodiment is not limited to be applied to such members but applied to any frame members of the vehicle body. This is similarly applied in embodiments described below. Further, a part of each of the B-pillar 10, the rocker 20, and the side panel 30 is shown in FIG. 1 to make its illustration clear. That is, each of the members 10, 20, and 30 is not cut, contrary to the illustration shown in FIG. 1, and therefore the each of the members 10, 20, and 30 is extended from a cut surface.

As shown in FIG. 1, firstly in the method for joining members of the present embodiment, the B-pillar 10, the rocker 20, the side panel 30, and an elastic body 40 (see FIG. 3B) used for joining of those members by press-fitting are provided.

Figure 2:
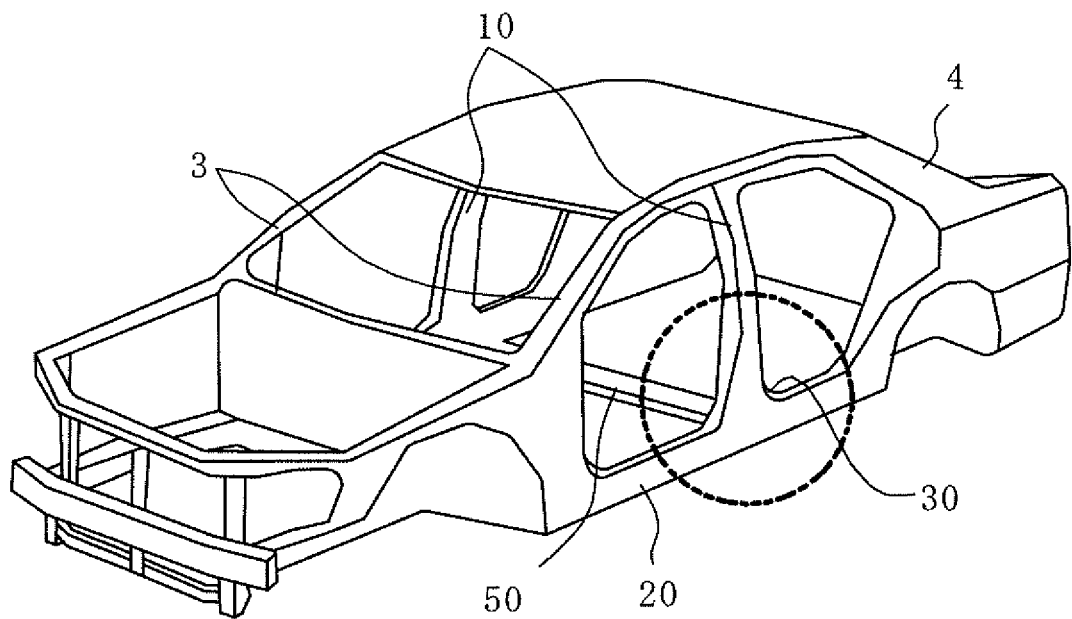
FIG. 2 is a perspective view illustrating a frame of a vehicle body.

The B-pillar 10 is a window column at a center in the side portion of the vehicle body (see FIG. 2). In the present embodiment, the B-pillar 10 is formed of high-tension steel. The B-pillar 10 includes a tubular portion 11 and an extension portion 12 extended from the tubular portion 11. The tubular portion 11 of the present embodiment is formed in a rectangular pipe shape extended in an axial line L1 direction. The extension portion 12 includes a recess portion 13 formed such that three walls among four walls forming the tubular portion 11 are extended in the axial line L1 direction, and two plate-like flange portions 14 extended outward from both end portions of the recess portion 13. That is, a cross-sectional shape of the extension portion 12 in the axial line L1 direction is formed in a hat shape defined by the recess portion 13 and the flange portions 14. Further, as shown in FIG. 2, generally in the frame member of the vehicle body, a window column 3 at a front side in the side portion of the vehicle body is called an A-pillar, a window column 10 at the center in the side portion of the vehicle body is called the B-pillar, and a window column 4 at a rear side in the side portion of the vehicle body is called a C-pillar.

As shown in FIG. 1 and FIG. 2, the rocker 20 is a frame member of the vehicle body extended in a front-rear direction (an axial line L2 direction orthogonal to the axial line L1) along a lower edge of the side portion of the vehicle body. In the present embodiment, the rocker 20 is formed of aluminum alloy. The rocker 20 is formed in a tubular shape having a substantially rectangular cross section provided with an outer wall of an upper wall 21, a lower wall 22, and two side walls 23 connecting the upper wall 21 and the lower wall 22. Further, the rocker 20 includes a partition wall 24 arranged parallel to the lower wall 22 so as to partition an inside, and a protrusion portion 25 protruded from the upper wall 21. Further, a hole portion (a first hole portion) 26 having a rectangular shape penetrating the upper wall 21 and the partition wall 24 in the axial line L1 direction is formed in the rocker 20. The hole portion 26 has a size that allows the tubular portion 11 of the B-pillar 10 to be inserted therein. Further, the lower wall 22 of the rocker 20 is not penetrated (see FIG. 3A).

The side panel 30 is a frame member of the vehicle body that forms the side portion of the vehicle body (see FIG. 2). In the present embodiment, the side panel 30 is formed of high-tension steel. The side panel 30 is formed as a substantially T-shaped panel member extended in the axial line L1 direction and the axial line L2 direction. The side panel 30 is press-formed such that both of a cross-sectional shape in the axial line L1 direction and a cross-sectional shape in the axial line L2 direction are formed in a hat shape. In particular, the cross-sectional shape in the axial line L1 direction of the side panel 30 is formed in a similar shape to the cross-sectional shape of the extension portion 12 of the B-pillar 10, and the cross-sectional shape in the axial line L1 direction of the side panel 30 is slightly larger than the cross-sectional shape of the extension portion 12 of the B-pillar 10. Thus, as shown in FIG. 1, the side panel 30 and the B-pillar 10 can be arranged to be overlapped. In the present embodiment, a part of the side panel 30 overlapped with the extension portion 12 of the B-pillar 10 forms a support portion 31 of the present invention.

The elastic body 40 (see FIG. 3B) is formed of rectangular parallelepiped rubber that can be inserted into the tubular portion 11 of the B-pillar 10. A length of the elastic body 40 may be set to allow the tubular portion 11 to deform near the joining portion. Examples of the material of the elastic body 40 include urethane rubber, chloroprene rubber, CNR rubber (chloroprene rubber+nitrile rubber) and silicone rubber.

A first process through a fifth process of the method for joining members of the present embodiment are described with reference to FIG. 3A through FIG. 3E, respectively. Here, FIG. 3A through FIG. 3D show a cross section of the hole portion 26 in the axial line L2 direction shown in FIG.

1. Further, FIG. 3A through FIG. 3D show the tubular portion 11 of the B-pillar 10, and the rocker 20, and FIG. 3E shows the extension portion 12 of the B-pillar 10, and the support portion 31 of the side panel 30, and in these figures, an illustration of other members is omitted.

Figure 3A:
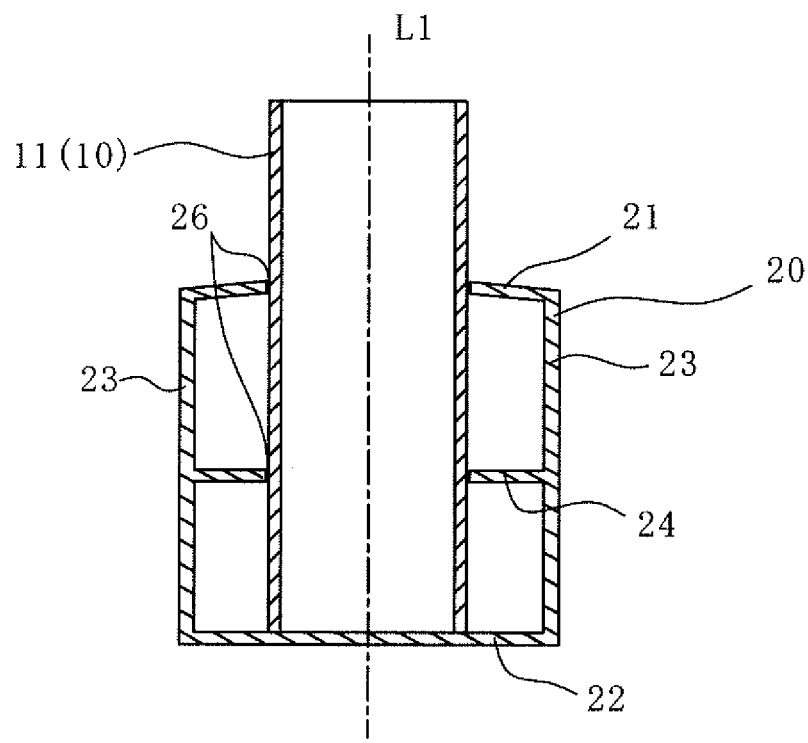
FIG. 3A is a cross-sectional view near a joining portion in a first process of the method for joining members according to the first embodiment.

As shown in FIG. 3A, in the first process, the tubular portion 11 of the B-pillar 10 is inserted into the hole portion 26 of the rocker 20. In a state in which the tubular portion 11 is inserted into the hole portion 26, the B-pillar 10 penetrates the upper wall 21 and the partition wall 24 of the rocker 20 to be arranged on the lower wall 22 of the rocker 20.

Figure 3B:
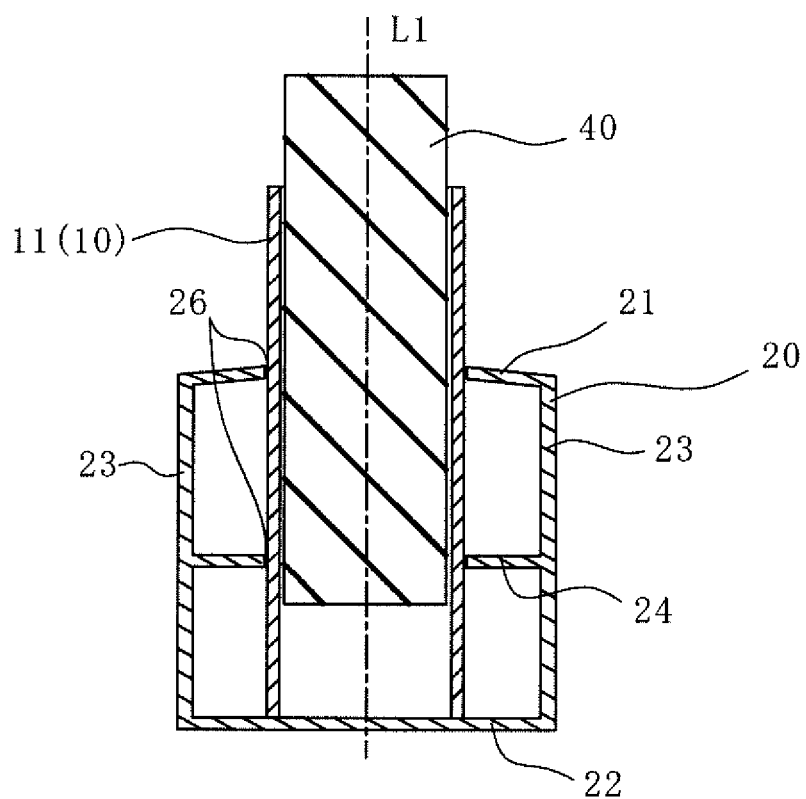
FIG. 3B is a cross-sectional view near the joining portion in a second process of the method for joining members according to the first embodiment.

As shown in FIG. 3B, in the second process, the elastic body 40 is inserted into the tubular portion 11 of the B-pillar 10. Instead of this, the B-pillar 10 may be inserted into the hole portion 26 of the rocker 20 in a state in which the elastic body 40 is inserted into the tubular portion 11. That is, the first process and the second process may be interchanged in the order.

Figure 3C:
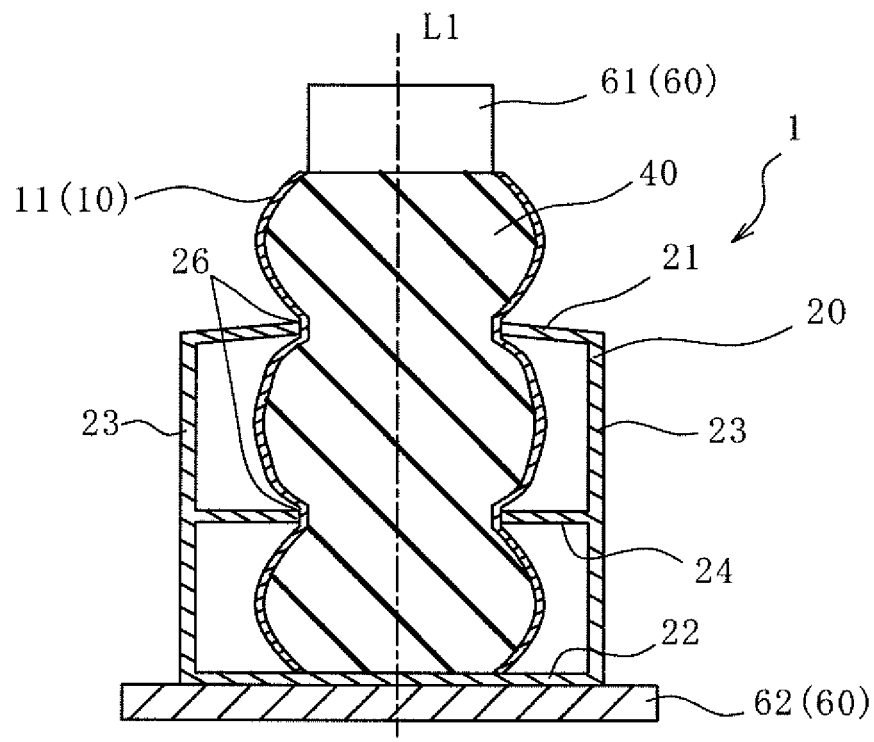
FIG. 3C is a cross-sectional view near the joining portion in a third process of the method for joining members according to the first embodiment.

As shown in FIG. 3C, in the third process, the B-pillar 10, the rocker 20, and the elastic body 40 are set in a pressurizing apparatus 60 in a state in which the B-pillar 10, the rocker 20, and the elastic body 40 are assembled to each other. The pressurizing apparatus 60 is formed to compress the elastic body 40 in the axial line L1 direction. For example, the pressurizing apparatus 60 may be constituted by a press device as described in the present embodiment, or alternatively constituted by a hydraulic cylinder or the like. The pressurizing apparatus 60 as the press device includes an pressurizer 61 and a receiving seat 62. The pressurizer 61 is formed in a rectangular parallelepiped shape that can be inserted into the tubular portion 11 of the B-pillar 10. An outer shape of the pressurizer 61 is substantially the same as an outer shape of the elastic body 40 when seen in the axial line L1 direction. A pressing face (a lower surface in the figure) of the pressurizer 61 is formed in a flat face orthogonal to the axial line L1 in order to press the elastic body 40 evenly. The receiving seat 62 is a base on which the lower wall 22 of the rocker 20 is set. A setting face (an upper surface in the figure) of the receiving seat 62 is formed in a flat face to be parallel to the pressing face of the pressurizer 61. In the present process, the elastic body 40 is interposed directly or indirectly between the pressurizer 61 and the receiving seat 62 of the pressurizing apparatus 60 so as to pressurize the elastic body 40 in the axial line L1. As a length of the elastic body 40 in the axial line L1 is decreased, a length thereof in a radial direction is increased. Accordingly, the tubular portion 11 of the B-pillar 10 receives force from the elastic body 40 expanded in the radial direction so as to deform and expand outward in the radial direction. The deformed and expanded tubular portion 11 of the B-pillar 10 is joined to the hole portion 26 of the rocker 20 by press-fitting, namely the tubular portion 11 is joined to the upper wall 21 and the partition wall 24 by press-fitting. Consequently, a joining body 1 in which the B-pillar 10 and the rocker 20 are joined is formed.

Figure 3D:
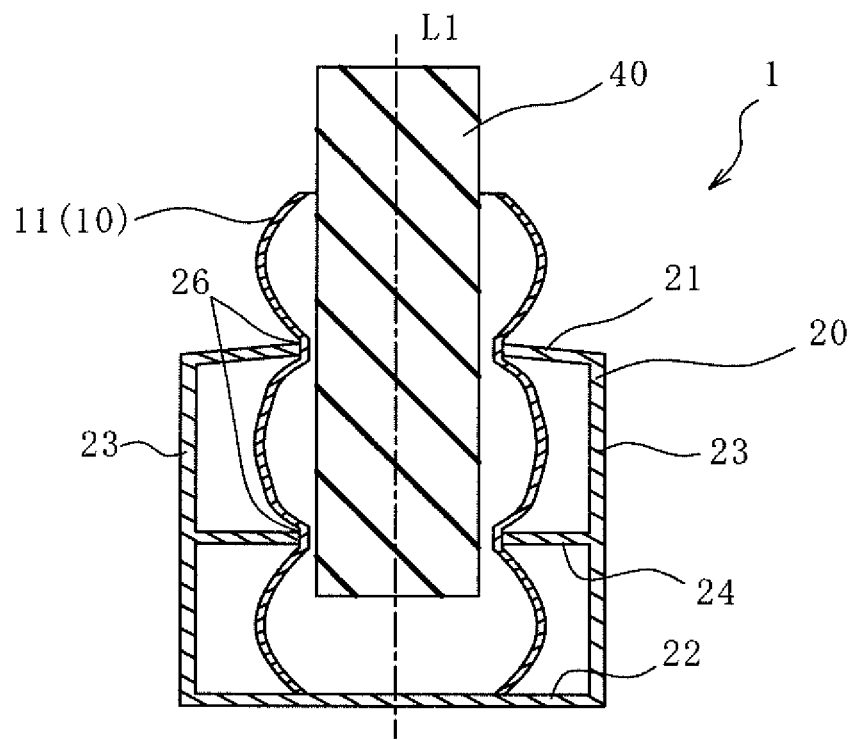
FIG. 3D is a cross-sectional view near the joining portion in a fourth process of the method for joining members according to the first embodiment.
Figure 3E:
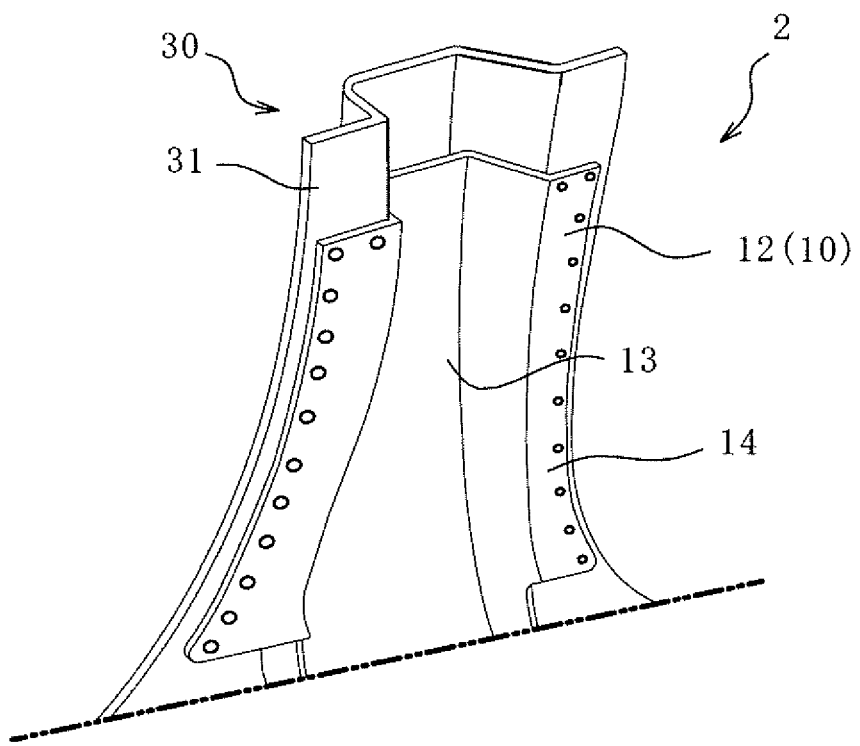
FIG. 3E is a partial perspective view in a fifth process of the method for joining members according to the first embodiment.

As shown in FIG. 3D, in the fourth process, the joining body 1 and the elastic body 40 are released from the pressurizing apparatus 60 (see FIG. 3C). The elastic body 40, from which the compression force is removed, is restored to its original shape due to its own elastic force. Accordingly, the elastic body 40 can be easily removed from the joining body 1.

As shown in FIG. 3E, in the fifth process, the flange portion 14 of the B-pillar 10 forming the joining body 1 and the support portion 31 of the side panel 30 are joined by self-pierce rivet joining. The joining body 1 and the side panel 30 are further joined by the self-pierce rivet joining, so that a joining body 2 in which the B-pillar 10, the rocker 20, and the side panel 30 are joined is formed. At this time, the protrusion portion 25 of the rocker 20 and the flange portion 14 of the side panel 30 may be further joined by the self-pierce rivet joining. Further, in the present embodiment, the self-pierce rivet joining generally used for joining different kind metal materials is exemplarily described as the method for joining the B-pillar 10 and the side panel 30, however the method for joining members is not limited to this. For example, clinching joining may be adopted.

According to the method for joining members according to the present embodiment described with reference to the first process through the fifth process described above, since the tubular portion 11 of the B-pillar 10 is deformed and expanded evenly by the elastic body 40, a local load imposed on the B-pillar 10 can be decreased, and therefore a local deformation can be prevented. Accordingly, the accuracy of fitting between the B-pillar 10 and the rocker 20 is improved, and therefore joining strength can be improved. Further, joining by press-fitting using the elastic body 40 is simple compared to the electromagnetic forming used for joining different kind materials or other joining method that requires processing, and therefore joining by press-fitting is especially effective for a case in which the B-pillar 10 and the rocker 20 are different materials from each other as described in the present embodiment. Further, since the B-pillar 10 includes the extension portion 12 and the side panel 30 includes the support portion 31, the extension portion 12 and the support portion 31 can be joined by a joining method other than joining by press-fitting using the elastic body 40. Thus, compared to a case in which only the B-pillar 10 and the rocker 20 are joined by press-fitting, the joining body 2 with a complicated configuration can be formed. In other words, since plural members are joined in various manners in the frame of the vehicle body, joining by press-fitting using the elastic body 40 that is simple and is not limited to an applicable material can be applied to a part including the tubular portion 11, and a known joining method other than joining by press-fitting can be applied to the other part. Consequently, plural frame members of the vehicle body can be joined easily. In particular, when joining by press-fitting is applied to the frame members of the vehicle body, the joining strength endurable against the impact in collision of the vehicle body is required. In this method, the B-pillar 10 and the side panel 30 are joined and the B-pillar 10 is supported by the side panel 30, and therefore the joining strength of the joining body 2 is improved so as to endure the impact in collision of the vehicle body.

Further, the B-pillar 10, the rocker 20, and the side panel 30 served as the frame members of the vehicle body are joined with high joining strength, and therefore the strength of the side portion of the vehicle body can be increased. Accordingly, the deformation of the vehicle body in collision of the side portion becomes less, and therefore a cabin in which a user is located in travelling can be firmly protected.

Modified Example of First Embodiment

Figure 4:
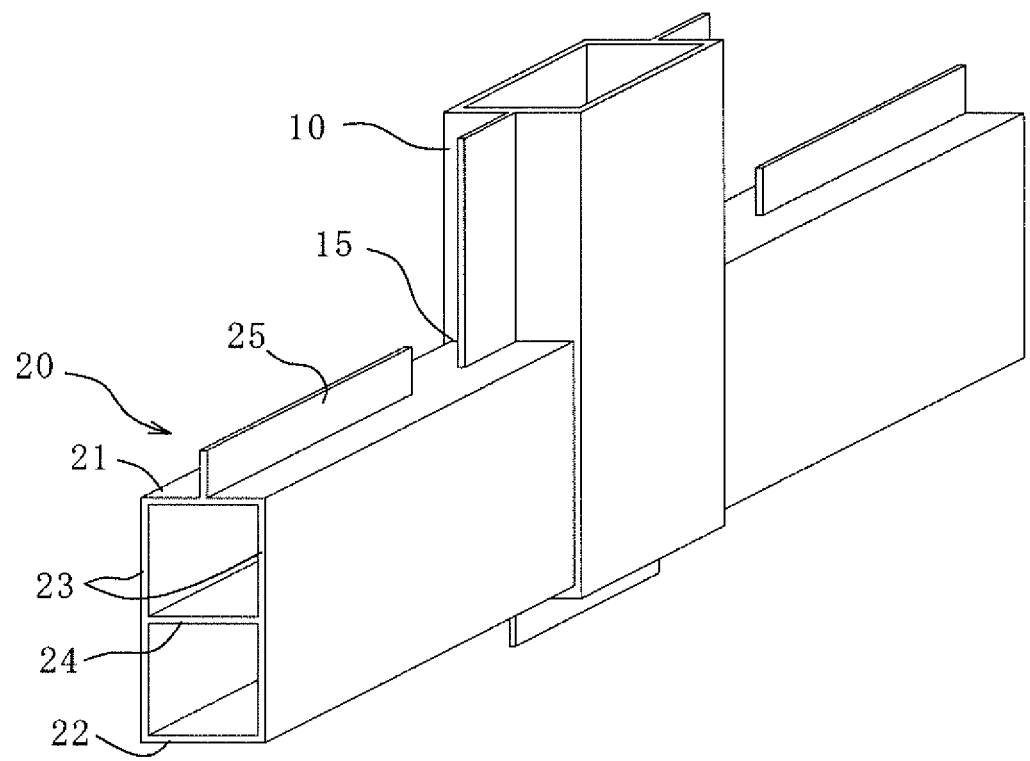
FIG. 4 is a perspective view illustrating a modified example of the first embodiment.

As shown in FIG. 4, in the present modified example, the hole portion 26 is not formed in the rocker 20, however a hole portion 15 is formed in the B-pillar 10, and the rocker 20 is inserted into the hole portion 15 of the B-pillar, so that the B-pillar 10 and the rocker 20 are joined by press-fitting similar to the first process through the fifth process described above. In the present modified example, the rocker 20 corresponds to the first member of the present invention, and the B-pillar 10 corresponds to the second member of the present invention. Specifically, the upper wall 21, the lower wall 22 and the two side walls 23 of the rocker 20 constitute the tubular portion of the present invention, and the protrusion portion 25 of the rocker 20 constitutes the extension portion of the present invention. Further, the B-pillar 10 is formed to be a closed cross section with respect to the axial line L1 direction as in the present modified example, and therefore the B-pillar 10 may not include a portion forming an opened cross section as shown in FIG. 1.

According to the present modified example, since the rocker 20 is inserted into the hole portion 15 of the B-pillar 10, the B-pillar 10 can be hardly dropped off from the rocker 20.

Second Embodiment

Figure 5:
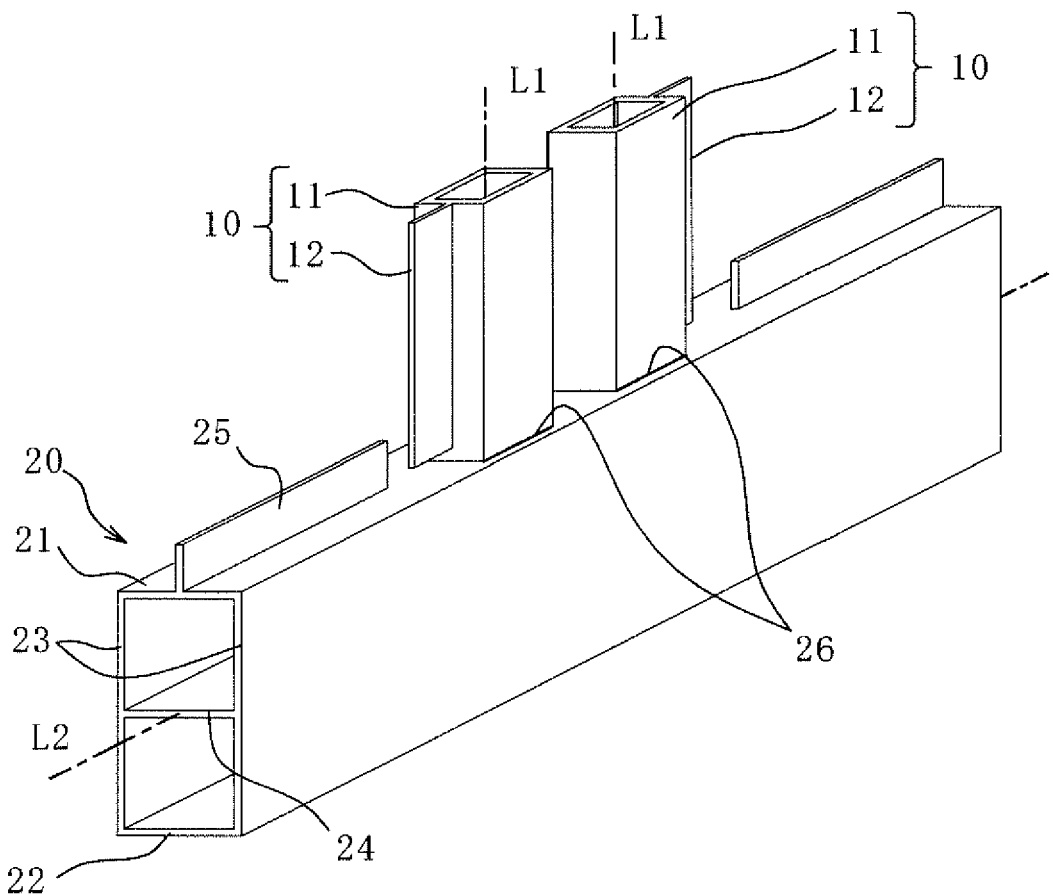
FIG. 5 is a perspective view illustrating the B-pillar, and the rocker panel to which the method for joining members of the first embodiment is applied.

FIG. 5 shows a method for joining members of a second embodiment. The present embodiment is substantially the same as the first embodiment except the shape of the B-pillar 10. Accordingly, the same symbol is assigned to the same component as the first embodiment, and the description of each process is omitted. Further, in order to make its illustration clear, an illustration of the side panel 30 is omitted.

As shown in FIG. 5, in the present embodiment, each of two B-pillars 10 and the rocker 20 are joined by press-fitting. The B-pillar 10 is formed to be a closed cross section having a substantially rectangular shape with respect to the axial line L1 direction, and therefore the B-pillar 10 does not include a portion forming an opened cross section as shown in FIG. 1. That is, the B-pillar 10 includes a tubular portion 11 extended in the axial line L1 direction and a plate-liked extension portion 12 protruded toward a side portion from the tubular portion 11, contrary to the first embodiment. In this way, the shape of each of the tubular portion 11 and the extension portion 12 is not especially limited, and therefore any shape may be adopted.

Figure 6:
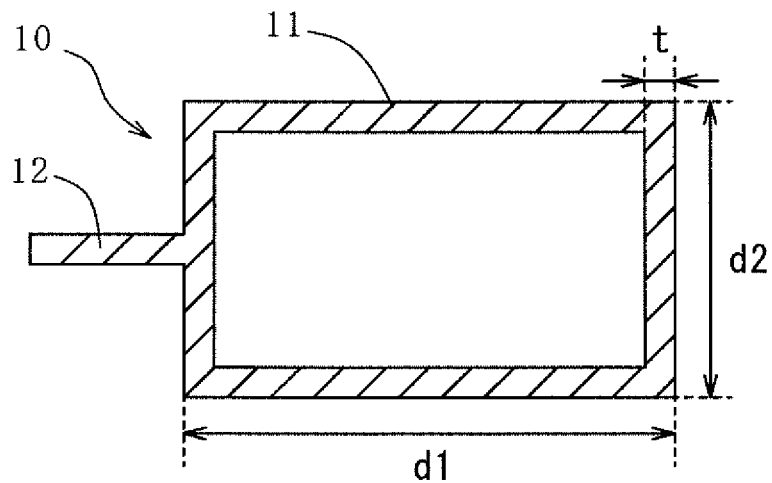
FIG. 6 is a cross-sectional view of the B-pillar shown in FIG. 5.

Further, as shown in FIG. 6, in a cross section of the tubular portion 11 of the B-pillar 10 in the axial line L1 direction, each side length d1, d2 (=d) of the B-pillar 10 fulfills a formula (2) below. In other words, since the cross-sectional shape of the tubular portion 11 of the B-pillar 10 is formed in a rectangular shape, each of four side lengths fulfills the formula (2) below. The formula (2) below is defined based on an effective width theory corresponding to a relationship between a size and deformation of a member. It is known that, when the formula (2) is fulfilled, the deformation of the tubular portion 11 of the B-pillar 10 is suppressed.

Formula 2

$$d < 1.9t \sqrt{\frac{E}{\sigma_y}} \quad (2)$$

d: each side length of the tubular portion 11 of the B-pillar 10 t: a plate thickness of the tubular portion 11 of the B-pillar 10

E: a Young's modulus of the tubular portion 11 of the B-pillar 10

$\sigma_y$: a yield stress of the tubular portion 11 of the B-pillar 10

According to the present embodiment, since two B-pillars 10 are arranged, joining by press-fitting can be applied to two points, and therefore the joining strength can be improved compared to a case in which one B-pillar 10 is arranged. Further, each of the B-pillars 10 can be formed to be a smaller diameter, and therefore the deformation of the tubular portion 11 can be suppressed. If the cross-sectional shape of the tubular portion 11 of the B-pillar 10 is extremely large, the cross section is deformed when a pull-off force is applied, and therefore the joining might be released. However, in the present embodiment using the formula (2), each side length d1, d2 (=d) in the cross-sectional shape of the B-pillar 10 is set to a predetermined effective width or less, and therefore the B-pillar 10 is hardly deformed when the pull-off force is applied, and the joining strength can be ensured. Here, each side length d in the formula (2) denotes a length excluding a rounded part of the side in a case in which a corner portion of the tubular portion 11 has the rounded part.

Third Embodiment

Figure 7:
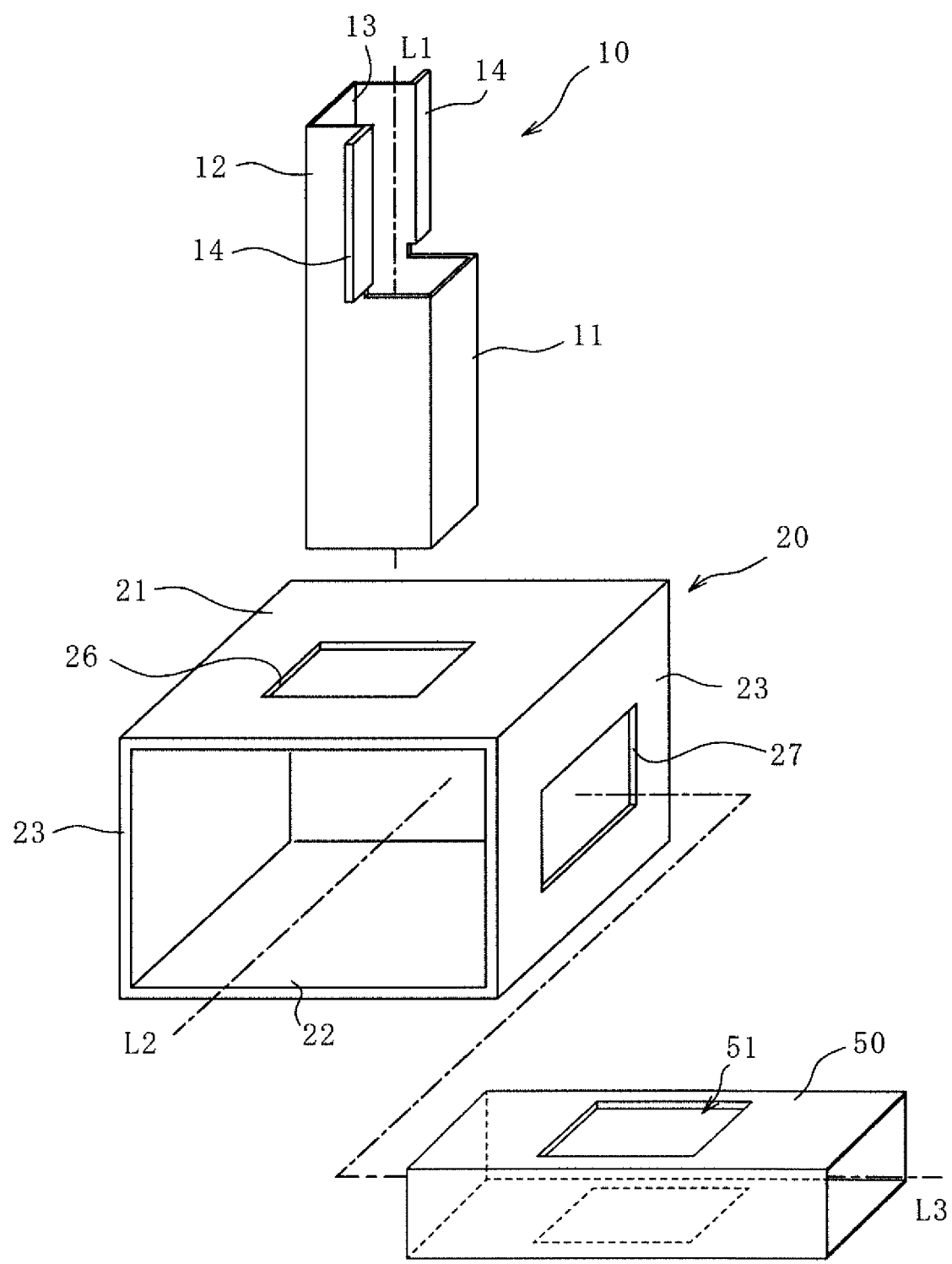
FIG. 7 is a perspective view illustrating a B-pillar, a rocker panel, and a floor cross member before a method for joining members according to a third embodiment is applied.
Figure 8:
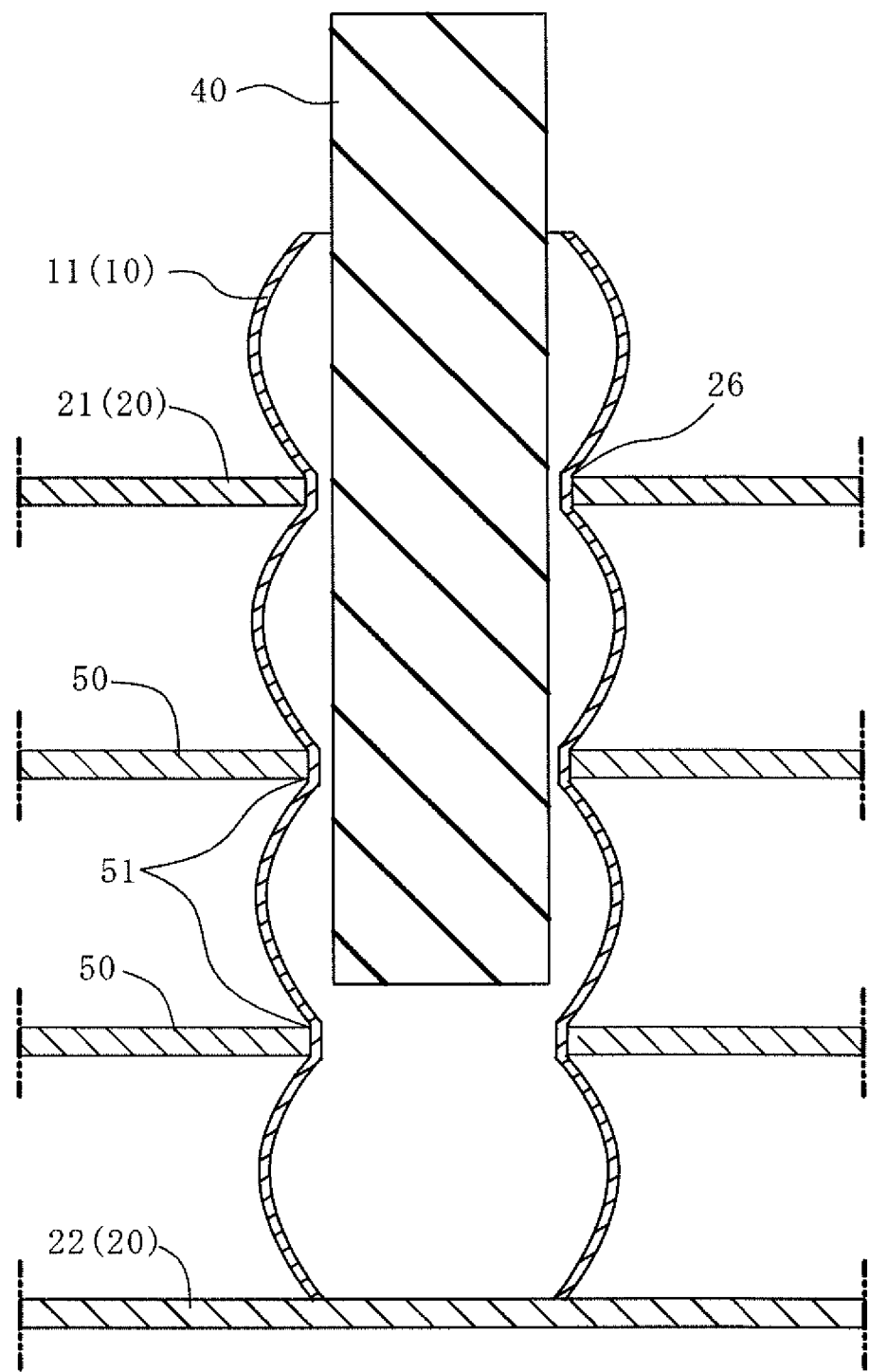
FIG. 8 is a perspective view illustrating the B-pillar, the rocker panel, and the floor cross member after the method for joining members according to the third embodiment is applied.

FIG. 7 and FIG. 8 show a method for joining members of a third embodiment. The present embodiment is substantially the same as the first embodiment except a floor cross member 50. Accordingly, the same symbol is assigned to the same component as the first embodiment, and the description of each process is omitted. Further, in order to make its illustration clear, an illustration of the side panel 30 is omitted.

In the present embodiment, the rocker 20 does not include the partition wall 24 (see FIG. 1) contrary to the first embodiment. Further, a first hole portion 26 having a rectangular shape is formed in the upper wall 21, and a second hole portion 27 having a rectangular shape is formed in one side wall 23 among two side walls 23.

Further, in the present embodiment, the floor cross member 50 (also see FIG. 2), which is a structural member of the vehicle body other than the B-pillar 10, the rocker 20, and the side panel 30 of the first embodiment, is further provided.

The floor cross member 50 is formed in a rectangular pipe shape extended in an axial line L3 direction orthogonal to the axial line L1 and the axial line L2. An insertion hole 51 penetrating the floor cross member 50 in the axial line L1 direction is formed in the floor cross member 50. The insertion hole 51 of the floor cross member 50 has substantially the same shape and the same size as the first hole portion 26 of the rocker 20. It is preferable that the insertion hole 51 and the first hole portion 26 are formed in a similar shape to each other.

In the present embodiment, the floor cross member 50 is inserted into the second hole portion 27 of the rocker 20 before a process corresponding to the first process (see FIG. 3A) of the first embodiment. Next, the first hole portion 26 of the rocker 20 and the insertion hole 51 of the floor cross member 50 are aligned to each other. Then, as described in the first process (see FIG. 3A) of the first embodiment, the tubular portion 11 of the B-pillar 10 is inserted into the first hole portion 26 of the rocker 20 and the insertion hole 51 of the floor cross member 50 aligned each other.

Further, in the present embodiment, in a process corresponding to the third process (see FIG. 3C) of the first embodiment, the tubular portion 11 of the B-pillar 10 is joined to not only the rocker 20 but also the floor cross member 50 by press-fitting as shown in FIG. 8 when the tubular portion 11 of the B-pillar 10 is expanded and deformed by the elastic body 40.

According to the present embodiment, not only three members but also four members can be joined as the frame of the vehicle body. In particular, since the B-pillar 10, the rocker 20, and the floor cross member 50 are joined by press-fitting using the elastic body 40, different kind materials can be joined easily. Further, the pull-off force and the bending force applied to the B-pillar 10 are transmitted to both of the rocker 20 and the floor cross member 50, and therefore the pull-off force and the bending force are not concentrated, so that the joining strength of the joining portion is improved.

Modified Example of Third Embodiment

Figure 9:
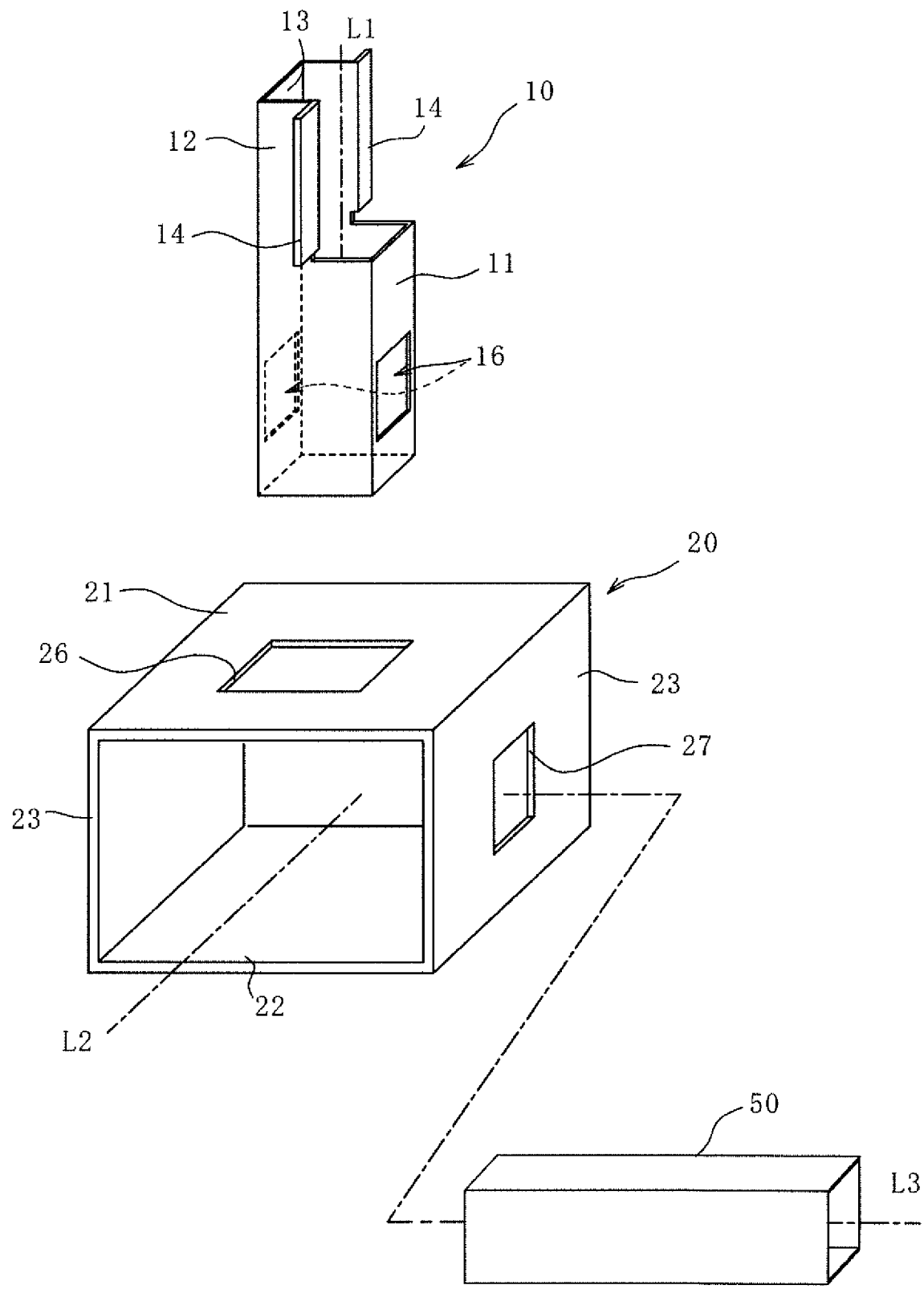
FIG. 9 is a perspective view before joining illustrating a modified example of the third embodiment.
Figure 10:
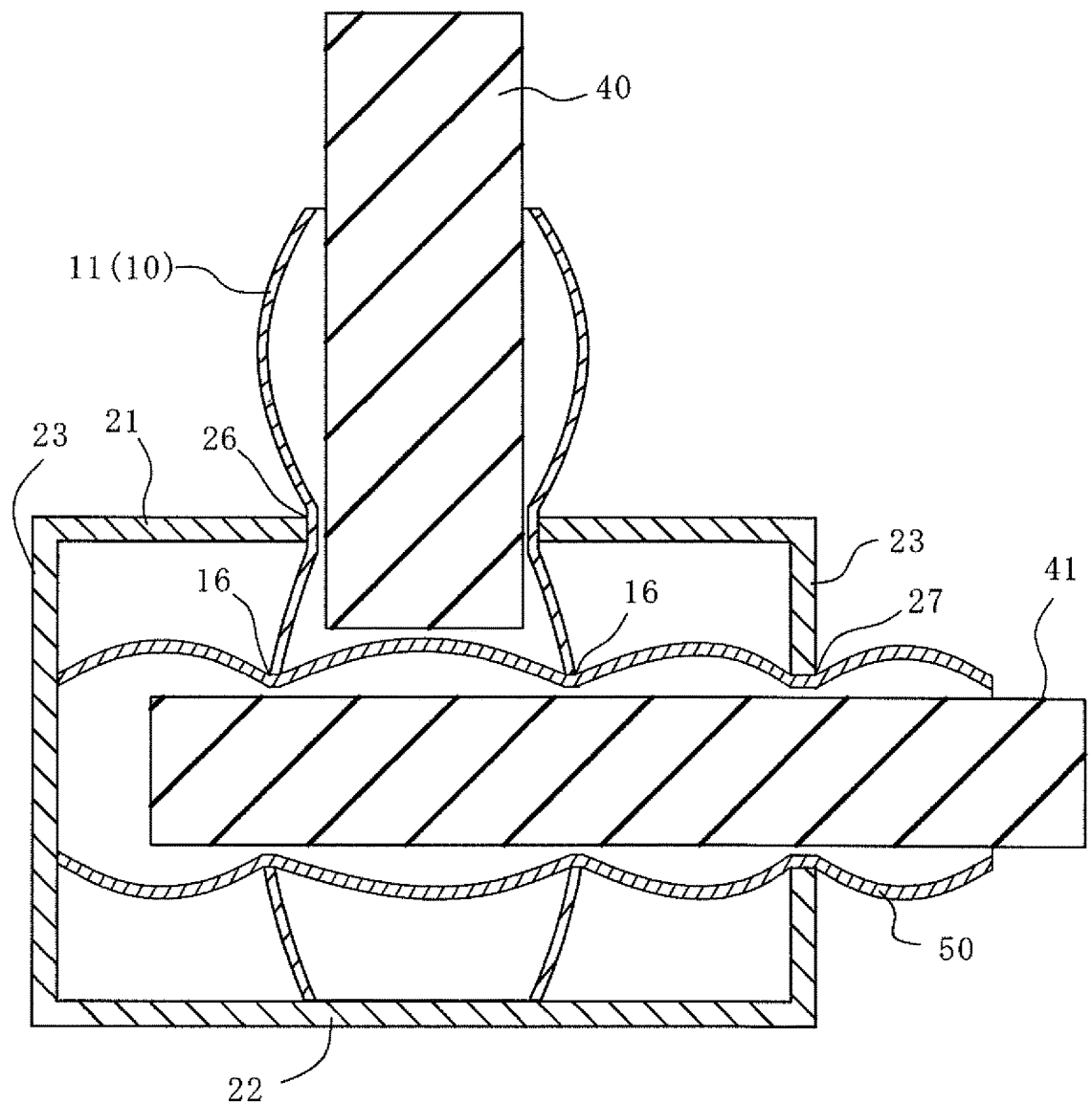
FIG. 10 is a cross-sectional view after the joining illustrating the modified example of the third embodiment.
Figure 11:
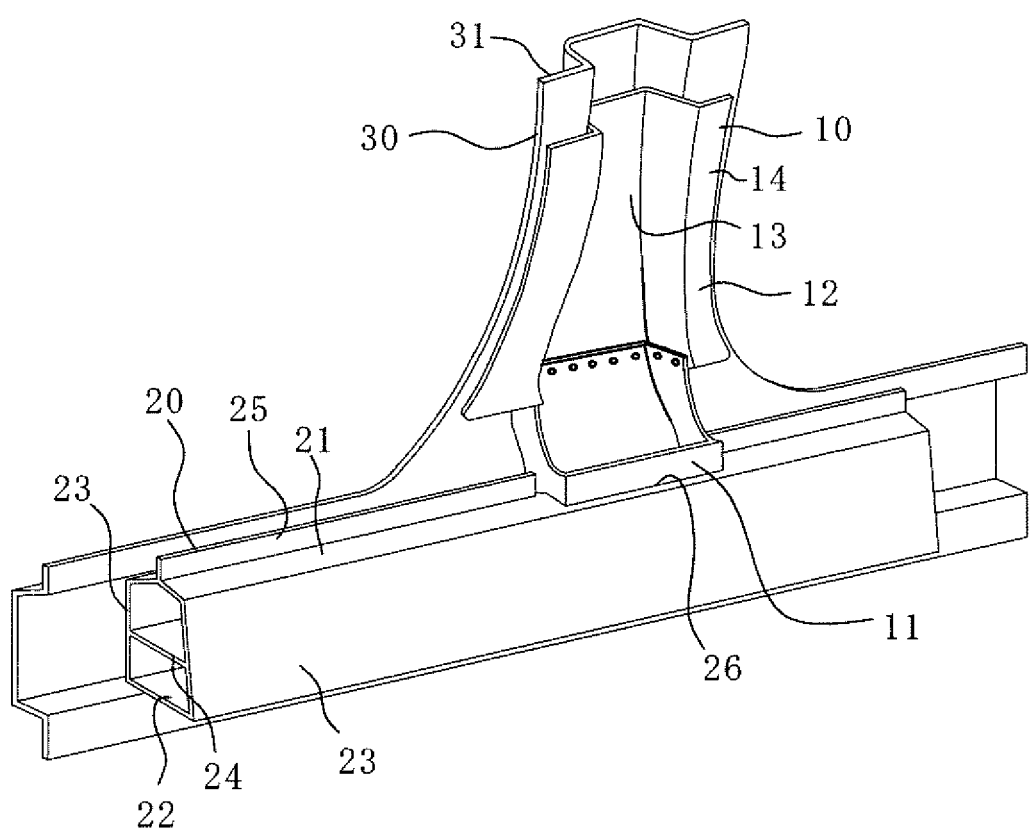
FIG. 11 is a perspective view illustrating a B-pillar, a rocker panel, and a side panel to which a method for joining members according to a fourth embodiment is applied.

As shown in FIG. 9 and FIG. 10, in the present modified example, the insertion hole 51 is not formed in the floor cross member 50, and an insertion hole 16 is formed in the tubular portion 11 of the B-pillar 10. Further, not only the elastic body 40 but also an additional elastic body 41 (see FIG. 9) is provided.

In the present modified example, in a process corresponding to the first process (see FIG. 3A) of the first embodiment, the tubular portion 11 of the B-pillar 10 is inserted into the first hole portion 26 of the rocker 20, and then the second hole portion 27 of the rocker 20 and the insertion hole 16 of the B-pillar 10 are aligned each other. Next, in a process corresponding to the third process (see FIG. 3C) of the first embodiment, the rocker 20 and the B-pillar 10 are joined by press-fitting using the elastic body 40, and then the floor cross member 50 is inserted into the first hole portion 26 of the rocker 20 and the insertion hole 16 of the B-pillar 10 aligned each other. After that, the additional elastic body 41 is inserted into the floor cross member 50. As shown in FIG. 10, the additional elastic body 41 is pressurized in the axial line L3 direction of the floor cross member 50 so that the additional elastic body 41 is expanded outward in the radial direction of the axial line L3. With this, the floor cross member 50 is expanded and deformed to be joined to the B-pillar 10 and the rocker 20 by press-fitting.

According to the present modified example, the B-pillar 10 is joined to the rocker 20 by press-fitting and the floor cross member 50 is joined to both of the B-pillar 10 and the rocker 20 by press-fitting, and therefore joining by press-fitting can be applied to plural points and the joining strength can be improved.

Fourth Embodiment

FIG. 10 shows a method for joining members of a fourth embodiment. The present embodiment is substantially the same as the first embodiment except the B-pillar 10. Accordingly, the same symbol is assigned to the same component as the first embodiment, and the description of each process is omitted. Further, in order to make its illustration clear, an illustration of the side panel 30 is omitted.

In the present embodiment, in the B-pillar 10, the tubular portion 11 and the extension portion 12 are separately formed. The tubular portion 11 is formed of aluminum alloy, which is the same metal material as the rocker 20, and the extension portion 12 is formed of high-tension steel. The tubular portion 11 and the extension portion 12 are joined by the self-pierce rivet joining. The tubular portion 11 and the extension portion 12 are fixed to each other so as to form a part of the B-pillar 10.

According to the present embodiment, the joining of the B-pillar 10 and the rocker 20 is performed between the same kind metal materials, and therefore electrocorrosion generated between the different kind metal materials can be prevented.

As described above, the specific embodiments and the modified examples thereof of the present invention were described, however the present invention is not limited to the embodiments and the modified examples. Accordingly, the embodiments and the modified examples can be modified within the present invention to carry out the present invention. For example, a configuration in which respective embodiments are combined appropriately can be adopted as one embodiment of the present invention.

The invention claimed is:

1. A method for joining members comprising:
providing a first member, a second member, a third member served as frame members of a vehicle body, and an elastic body, the first member including a tubular portion and an extension portion extended from the tubular portion, the second member including a first hole portion, and the third member including a support portion;
inserting the tubular portion of the first member into the first hole portion of the second member;
inserting the elastic body into the tubular portion of the first member;
pressurizing the elastic body in an axial line direction of the tubular portion of the first member to be expanded outward in a radial direction of the axial line, so that the tubular portion of the first member is expanded and deformed to be joined to the first hole portion of the second member by press-fitting; and
joining the extension portion of the first member and the support portion of the third member by a method different from joining by press-fitting.

2. The method for joining members according to claim 1, wherein a cross section of the tubular portion of the first member in the axial line direction is formed in a polygonal shape; and
each side length of the polygonal shape of the first member in the cross section fulfills the following formula:

$$d < 1.9t\sqrt{\frac{E}{\sigma_y}}$$

d: each side length of the tubular portion of the first member
t: a plate thickness of the tubular portion of the first member
E: a Young's modulus of the tubular portion of the first member
$\sigma_y$: a yield stress of the tubular portion of the first member.

3. The method for joining members according to claim 2, further comprising:
providing a fourth member in which an insertion hole is formed, the fourth member being formed in a tubular shape, as a frame member of the vehicle body;
inserting the fourth member into a second hole portion of the second member, the second hole portion being different from the first hole portion;
aligning the first hole portion of the second member and the insertion hole of the fourth member;

inserting the first member into the first hole portion of the second member and the insertion hole of the fourth member aligned each other; and joining the first member to not only the second member but also the fourth member by press-fitting when the first member is expanded and deformed by the elastic body.

4. The method for joining members according to claim 3, wherein:
the tubular portion of the first member is formed of a same kind material as the second member; and
the extension portion of the first member is formed of a same kind material as the third member.

5. The method for joining members according to claim 2, further comprising;
providing a fourth member formed in a tubular shape, as a frame member of the vehicle body, and an additional elastic body;
inserting the tubular portion of the first member into the first hole portion of the second member and then aligning a second hole portion of the second member and an insertion hole of the first member, the second hole portion being different from the first hole portion, and the insertion hole being formed in the tubular portion of the first member;
joining the first member and the second member by press-fitting using the elastic body and then inserting the fourth member into the first hole portion of the second member and the insertion hole of the first member aligned each other;
inserting the additional elastic body into the fourth member; and
pressurizing the additional elastic body in an axial line direction of the fourth member to be expanded outward in a radial direction of the axial line, so that the fourth member is expanded and deformed to be joined to the first member and the second member by press-fitting.

6. The method for joining members according to claim 5, wherein:
the tubular portion of the first member is formed of a same kind material as the second member; and
the extension portion of the first member is formed of a same kind material as the third member.

7. The method for joining members according to claim 2, wherein:
the tubular portion of the first member is formed of a same kind material as the second member; and
the extension portion of the first member is formed of a same kind material as the third member.

8. The method for joining members according to claim 2, wherein:
the first member is formed as a B-pillar as a window column at a center of a side portion of the vehicle body;
the second member is formed as a rocker extended in a front-rear direction along a lower edge of the side portion of the vehicle body; and
the third member is formed as a side panel forming the side portion of the vehicle body.

9. The method for joining members according to claim 1, further comprising:
providing a fourth member in which an insertion hole is formed, the fourth member being formed in a tubular shape, as a frame member of the vehicle body;

inserting the fourth member into a second hole portion of the second member, the second hole portion being different from the first hole portion;
aligning the first hole portion of the second member and the insertion hole of the fourth member;
inserting the first member into the first hole portion of the second member and the insertion hole of the fourth member aligned each other; and
joining the first member to not only the second member but also the fourth member by press-fitting when the first member is expanded and deformed by the elastic body.

10. The method for joining members according to claim 9, wherein:
the tubular portion of the first member is formed of a same kind material as the second member; and
the extension portion of the first member is formed of a same kind material as the third member.

11. The method for joining members according to claim 1, further comprising;
providing a fourth member formed in a tubular shape, as a frame member of the vehicle body, and an additional elastic body;
inserting the tubular portion of the first member into the first hole portion of the second member and then aligning a second hole portion of the second member and an insertion hole of the first member, the second hole portion being different from the first hole portion, and the insertion hole being formed in the tubular portion of the first member;
joining the first member and the second member by press-fitting using the elastic body and then inserting the fourth member into the first hole portion of the second member and the insertion hole of the first member aligned each other;
inserting the additional elastic body into the fourth member; and
pressurizing the additional elastic body in an axial line direction of the fourth member to be expanded outward in a radial direction of the axial line, so that the fourth member is expanded and deformed to be joined to the first member and the second member by press-fitting.

12. The method for joining members according to claim 11, wherein:
the tubular portion of the first member is formed of a same kind material as the second member; and
the extension portion of the first member is formed of a same kind material as the third member.

13. The method for joining members according to claim 1, wherein:
the tubular portion of the first member is formed of a same kind material as the second member; and
the extension portion of the first member is formed of a same kind material as the third member.

14. The method for joining members according to claim 1, wherein:
the first member is formed as a B-pillar as a window column at a center of a side portion of the vehicle body;
the second member is formed as a rocker extended in a front-rear direction along a lower edge of the side portion of the vehicle body; and
the third member is formed as a side panel forming the side portion of the vehicle body.

* * * * *